(12) United States Patent
Knappmann et al.

(10) Patent No.: US 7,660,078 B2
(45) Date of Patent: Feb. 9, 2010

(54) SLIDER WITH A CONSTANT FLYING HEIGHT

(75) Inventors: Stephan Knappmann, Rottweil (DE); Juergen Moessner, Brigachtal (DE)

(73) Assignee: Thomson Licensing, Boulogne Billancourt (FR)

( * ) Notice: Subject to any disclaimer, the term of this patent is extended or adjusted under 35 U.S.C. 154(b) by 464 days.

(21) Appl. No.: 11/547,374

(22) PCT Filed: Jan. 24, 2005

(86) PCT No.: PCT/EP2005/000642

§ 371 (c)(1),
(2), (4) Date: Oct. 3, 2006

(87) PCT Pub. No.: WO2005/098835

PCT Pub. Date: Oct. 20, 2005

(65) Prior Publication Data

US 2007/0211388 A1   Sep. 13, 2007

(30) Foreign Application Priority Data

Apr. 8, 2004   (DE) .................... 10 2004 018 049

(51) Int. Cl.
*G11B 21/21* (2006.01)
*G11B 21/08* (2006.01)
*G11B 5/55* (2006.01)

(52) U.S. Cl. ............... 360/266.6; 360/267.6; 720/676

(58) Field of Classification Search ............. 360/266.5, 360/266.6, 267.6; 720/674–677, 663–666; 369/300, 13.11–13.12
See application file for complete search history.

(56) References Cited

U.S. PATENT DOCUMENTS 4,032,927 A   6/1977   Goshima (Continued)

FOREIGN PATENT DOCUMENTS

EP   1363285 A1 *  11/2003

(Continued)

OTHER PUBLICATIONS

Search Report Dated Apr. 25, 2005.

*Primary Examiner*—Craig A Renner
*Assistant Examiner*—Gustavo Polo
(74) *Attorney, Agent, or Firm*—Robert D. Shedd; Harvey D. Fried; Patricia Verlangieri

(57) ABSTRACT

The present invention relates to a slider having a constant flying height for an optical drive which is operated at a constant angular velocity. It is an object of the invention to propose a simple and cost-effective solution to allow the flying height of the slider to be kept virtually constant over the entire area of a storage medium, despite a variable linear velocity during operation at a constant angular velocity. According to the invention, this object is achieved by a drive for a storage medium which is driven at a constant angular velocity, having a slider which is attached by means of a spring arm to a carriage and floats on an air cushion above or under the rotating storage medium, and having a guide which guides the carriage relative to the storage medium, in which the guide is arranged such that the attachment point of the spring arm to the carriage is guided closer to the surface of the storage medium as the radius of the storage medium increases.

5 Claims, 1 Drawing Sheet

U.S. PATENT DOCUMENTS

| | | |
|---|---|---|
| 4,814,007 A | 3/1989 | Lin et al. |
| 4,943,876 A * | 7/1990 | Kawahara ............... 360/267.6 |
| 5,644,451 A * | 7/1997 | Chan et al. .............. 360/254.8 |
| 5,986,850 A | 11/1999 | Wang et al. |
| 6,178,157 B1 | 1/2001 | Berg et al. |
| 6,317,294 B1 | 11/2001 | Wada et al. |
| 7,516,465 B2 | 4/2009 | Van Der Aa |
| 2001/0033546 A1 | 10/2001 | Katayama |

FOREIGN PATENT DOCUMENTS

| | | |
|---|---|---|
| JP | 62-245560 | 10/1987 |
| JP | 62245560 A * | 10/1987 |
| JP | 2-162519 | 6/1990 |
| JP | 2003004039 A * | 1/2003 |

* cited by examiner

SLIDER WITH A CONSTANT FLYING HEIGHT

This application claims the benefit, under 35 U.S.C. § 365 of International Application PCT/EP05/000642, filed Jan. 24, 2005, which was published in accordance with PCT Article 21(2) on Oct. 20, 2005 in English and which claims the benefit of German patent application No. 102004018049.0, filed Apr. 8, 2004.

FIELD OF THE INVENTION

The present invention relates to a slider having a constant flying height for an optical drive which is operated at a constant angular velocity.

BACKGROUND OF THE INVENTION

In hard disk technology, read/write heads are used, which are referred to in the following text as sliders, which are in the form of flying bodies and float on a thin air cushion above the storage disks of the hard disk. The air cushion is in this case produced by rapid rotation of the hard disk. The slider is attached to the end of a spring arm and is moved by it to the respective write/read positions for the hard disk. Efforts are being made to use sliders such as these for optical and/or magneto-optical recording and replay systems, as well.

A slider-based recording system allows to achieve high storage densities by moving either a focusing lens or a magnet coil very close to the surface of a material which is suitable for data storage. This allows the use of optics with a high numerical aperture (NA). Furthermore, in the case of magneto-optical recording, methods for magnet superresolution (MSR, e.g. MAMMOS (magnetic amplifying magneto-optical system), DWDD (domain wall displacement detection)) may be combined with the high NA. In a recording system with a rotating storage medium, a slider is raised by means of an air cushion between the surface of the storage medium and the slider base surface. There is a force equilibrium between an externally applied holding-down force and the air cushion, with a correspondingly associated flying height of the slider. The lift force on the slider produced by the air cushion is dependent on the linear velocity at which the storage medium moves under the slider. In order to keep the flying height of the slider constant from the smallest to the largest radius over the entire area of the storage medium, it would be possible to use a constant linear velocity by controlling the rotation frequency of the drive motor for the storage medium as a function of the radius (CLV mode, constant linear velocity). This solution has the disadvantage, however, of reduced access speeds in comparison to the use of a constant angular velocity of the storage medium (CAV mode), since the storage medium must be braked or accelerated appropriately when large sudden radial changes occur. However, the linear velocity of the storage medium relative to the slider varies in the CAV mode, so that the lift force on the slider also varies as a function of the respective radius on the storage medium. This is illustrated in FIG. 1, which shows a measurement of the flying height of the slider as a function of the rotation speed. In the CAV mode, this is equivalent to the relationship between the flying height and the radius since, in this case, the speed of flight rises linearly as the radius increases. However, for reading and/or writing, the flying height of the slider must be kept virtually constant over the entire area of the storage medium.

In one known solution which is used as standard for hard disks, the tracking is carried out by means of a pivoting arm with pivot suspension. This means that there is only one radius on the storage medium at which the slider center point is tangential with respect to the track. The angular position of the slider with respect to the data track varies as a result of pivoting to other radii, so that the incident flow direction resulting from the air flow produced by the rotating storage medium also varies. The air cushion between the slider and the storage medium is thus formed differently, which is used to vary and to compensate for the flying height. However, this method works only in conjunction with a pivot spring arm suspension, and not with linear tracking mechanisms.

US 2001/0033546 A1 discloses a further method for controlling the flying height. The aim of the slider method is to move a lens or coil element to a constant working distance from the surface of the storage medium, corresponding to near-field or far-field recording. If the flying height of the slider varies as a result of a change in the linear velocity, the change in the flying height is compensated for in this solution by moving the write/read element on the slider in the opposite direction to this, in the direction of the optical axis. The distance between the write/read unit and the surface is thus kept constant by means of a thermal expansion element or piezo-actuator. One disadvantage of this solution is the costly and complicated manufacture as a result of assembly, contact making and driving an additional microactuator on the slider.

In U.S. Pat. No. 6,178,157 B1, the contact pressure force of the slider, which determines the flying height when there is a force equilibrium with the lift force from the air cushion, is controlled by an actuator. In systems with focusing optics, the focus error signal is used as the controlled variable. This solution requires a costly and complicated actuator mechanism and control.

U.S. Pat. No. 5,986,850 and U.S. Pat. No. 6,317,294 B1 disclose solutions in which the lower face of the slider is designed such that overpressure zones, which result in the flying height of the slider increasing, and underpressure zones, which result in the flying height of the slider decreasing, are formed. When the linear velocity of the storage medium changes, the resultant lift force produced by these two components remains constant, so that the flying height of the slider also remains constant. This solution involves complicated manufacture of the structures on the lower face of the slider.

A further solution is known from WO 03/034416 A2. During operation, the slider has a pitch angle in the direction of flight. As the linear velocity rises, that is to say as the flying height rises, the pitch angle also increases. In this case, a slider type was chosen whose trailing edge falls and whose leading edge rises. This results in the slider having an imaginary rotation axis about which it is rotated. A lens was placed accurately on the slider such that its focal point lies on this imaginary rotation axis. When the linear velocity changes, the slider now rotates about this axis, on which the focal point is located. The distance between the focal point and the surface of the storage medium thus remains constant. This solution has the disadvantage that a specific slider design must be used with a rotation axis which is governed by the change in the pitch angle, taking account of the geometry and weight of the lens that is used. Furthermore, the method works only when spherical lenses are used on the slider.

SUMMARY OF THE INVENTION

It is an object of the invention to propose a simple and cost-effective solution to allow the flying height of the slider to be kept virtually constant over the entire area of the storage medium despite the variable linear velocity in the CAV mode.

According to the invention, this object is achieved by a drive for a storage medium which is driven at a constant angular velocity, having a slider which is attached by means of a spring arm to a carriage and floats on an air cushion above or under the rotating storage medium, and having a guide which guides the carriage relative to the storage medium, in which the guide is arranged such that the attachment point of the spring arm to the carriage is guided closer to the surface of the storage medium as the radius of the storage medium increases. The flying height results from the force equilibrium between the lift force of the air cushion between the slider and the storage medium and the slider contact pressure force, introduced via the spring arm. In the case of the CAV principle, the linear velocity of the storage medium with respect to the stationary slider increases at larger radii. This results in a more powerful air cushion being formed, so that the lift force increases and the flying height of the slider increases. In order to keep the flying height constant, the prestress on the spring arm is now increased to the same extent by moving the attachment point of the spring arm, and thus the read and/or write unit, closer to the surface as the radius increases. The closer the suspension point of the spring arm is to the surface, the stronger is the spring prestress and thus the stronger is the holding-down force. The invention has the advantage that the flying height compensation is anchored in a simple manner in the mechanical design without any need for an additional active actuator. At the same time, the CAV principle can be used with optimized access times in conjunction with linear tracking mechanisms.

The guide is advantageously a linear guide, which is inclined relative to the surface of the storage medium. In this case, the slider is guided along an inclined plane in the direction of the surface, which can be implemented easily. Since, in this case, the linear velocity and the spring prestress increase linearly with the radius, this arrangement is worthwhile when the lift force also increases linearly, or virtually linearly, with the linear velocity.

According to the invention, the inclination or the distance between the guide and the surface of the storage medium can be set in the factory. This makes it possible to use different slider/spring arm configurations without any special design. Only the inclination and/or the distance of the guide need be set appropriately.

Furthermore, the distance between the guide and the surface of the storage medium can advantageously be varied reversibly by means of a suitable control mechanism. This makes it possible, for example, to match the drive to different angular velocities of the storage medium, for different media.

A drive according to the invention is preferably used in an appliance for reading from and/or writing to storage media.

BRIEF DESCRIPTION OF THE DRAWINGS

In order to assist understanding, the invention will be explained in the following text with reference to FIGS. 1 to 3, in which.

DETAILED DESCRIPTION OF PREFERRED EMBODIMENTS

Figure 1:
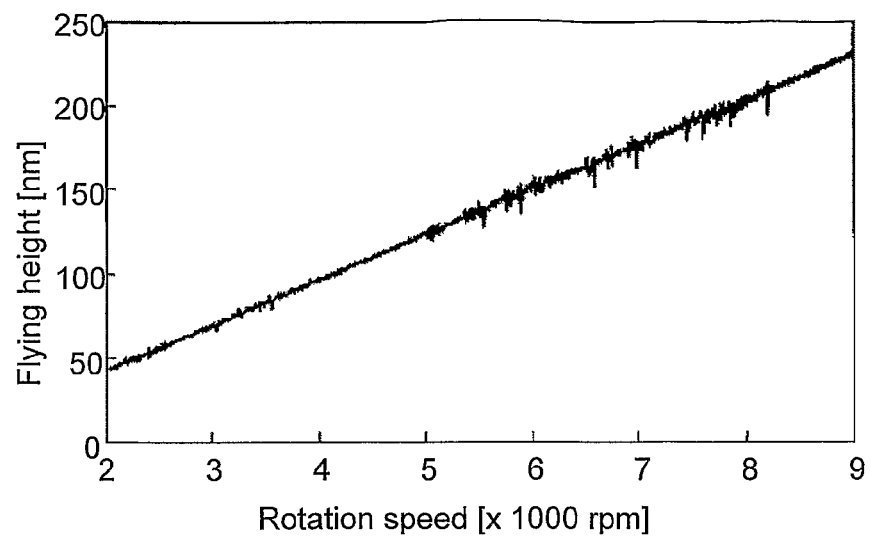
FIG. 1 shows a measurement of the flying height of the slider as a function of the rotation speed.
Figure 2:
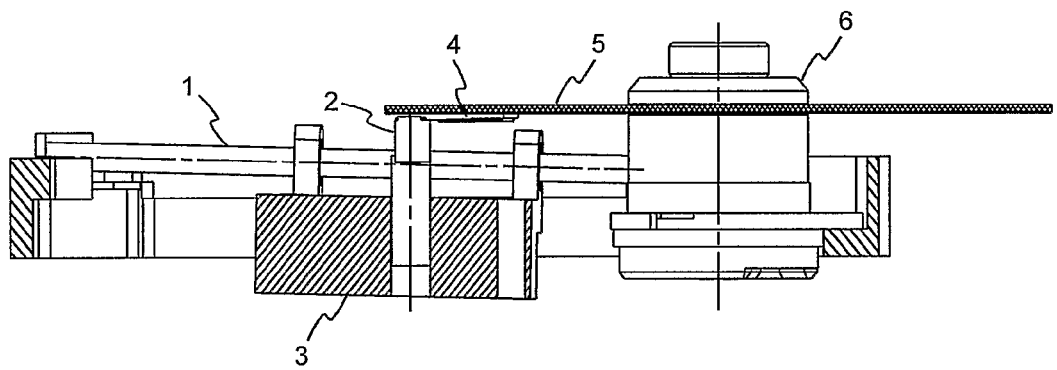
FIG. 2 shows a slider-based drive for storage media according to the invention.
Figure 3:
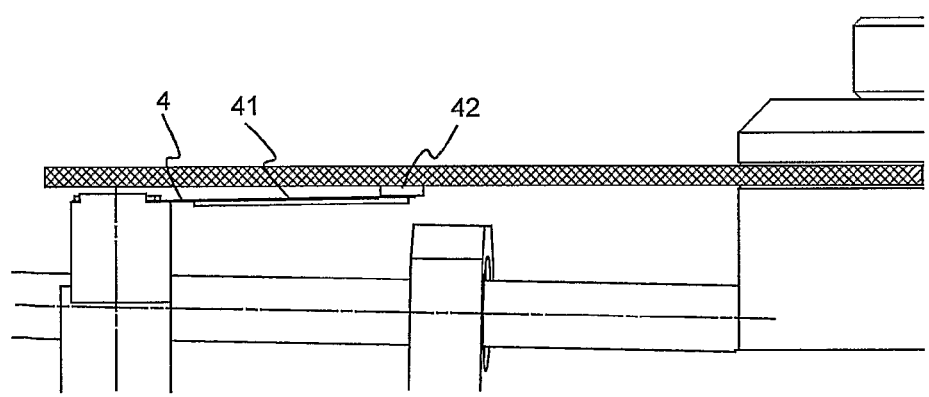
FIG. 3 shows an enlarged detail of a slider/spring arm assembly.

FIG. 2 shows a slider-based drive according to the invention for storage media. Owing to its major advantages in terms of access times, the CAV principle is preferred for many data storage apparatuses. An optical, magnetic, magneto-optical or other write and/or read unit (not illustrated) is moved to a defined distance from a storage medium 5. A tracking function allows data to be written to and/or read from the entire area of the rotating storage medium 5, which is held and driven by a motor and holding unit 6. In order to achieve a high storage density, a slider/spring arm assembly 4 is used as a support for the write and/or read unit, as is illustrated in the form of an enlarged detail in FIG. 3. When the storage medium 5 is rotating, a force equilibrium is formed between the lift force created by an air cushion between the slider 42 and the storage medium 5, and the contact pressure force of the spring arm 41. This results in a distance of about 10 nanometers to about 3 micrometers, depending on the slider type and the type of application, between the slider 42 and the storage medium 5. This distance should remain virtually constant over the entire area of the storage medium 5, in order to make it possible to ensure that the write and/or read unit can read and/or write data. When using the CAV principle, the distance between the slider 42 and the storage medium 5 varies with the radius of the storage medium 5 that is currently being accessed. The lift force produced by the air cushion rises with the linear velocity at which the storage medium 5 is being rotated under the slider 42. The distance between the slider 42, and thus the write and/or read unit as well, and the storage medium 5 thus also increases. This distance change adversely affects the operation of the write and/or read unit and must be compensated for. This is achieved by a simple mechanical design. The guides 1 for a carriage 3 to which the write and/or read unit is fitted are arranged slightly inclined with respect to the surface of the storage medium 5, to be precise in such a way that an attachment unit 2 for the slider/spring arm 74 is moved closer to the surface thereof for larger radii on the storage medium 5. This increases the spring prestress of the spring arm 41 on the slider 42, so that the increased lift force on the slider 42 is virtually compensated for when accessing larger radii on the storage medium 5.

The variable inclination of the guide rods 1 and of the attachment unit 2 for the slider/spring arm assembly 4 makes it possible to adjust the compensation for different slider/spring arm configurations 4.

The invention claimed is:

1. A drive for a storage medium which is driven at a constant angular velocity, comprising:
   a slider which is attached to a carriage at an attachment point by means of a spring arm, which exerts a force on the slider in the direction of the storage medium, the slider floating on an air cushion above or under the rotating storage medium, and having a guide which guides the carriage relative to the storage medium, wherein the guide is arranged such that the attachment point is guided closer to the surface of the storage medium as the radius of the storage medium increases to maintain a substantially constant slider fly height.

2. The drive as claimed in claim 1, wherein the guide is a linear guide which is inclined relative to the surface of the storage medium.

3. The drive as claimed in claim 2, wherein the inclination of the guide relative to the surface of the storage medium is variable.

4. The drive as claimed in claim 2, wherein the distance between the guide and the surface of the storage medium is variable.

5. An appliance for reading from and/or writing to storage media, wherein the appliance has a drive as claimed in claim 1.

* * * * *